US010966143B2

(12) United States Patent
Eskildsen et al.

(10) Patent No.: US 10,966,143 B2
(45) Date of Patent: Mar. 30, 2021

(54) SYSTEMS AND METHODS FOR DETECTING AND AVOIDING RADIO INTERFERENCE IN A WIRELESS SENSOR NETWORK

(71) Applicant: Ademco Inc., Golden Valley, MN (US)

(72) Inventors: Kenneth Eskildsen, Great Neck, NY (US); Sandeep Suresh, Bangalore (IN); Thomas Winkeler, Saint James, NY (US)

(73) Assignee: Ademco Inc., Golden Valley, MN (US)

( * ) Notice: Subject to any disclaimer, the term of this patent is extended or adjusted under 35 U.S.C. 154(b) by 0 days.

(21) Appl. No.: 16/538,140

(22) Filed: Aug. 12, 2019

(65) Prior Publication Data

US 2019/0364487 A1 Nov. 28, 2019

Related U.S. Application Data

(63) Continuation of application No. 15/464,687, filed on Mar. 21, 2017, now Pat. No. 10,412,663.

(51) Int. Cl.
*H04W 48/10* (2009.01)
*H04W 4/70* (2018.01)
(Continued)

(52) U.S. Cl.
CPC .......... *H04W 48/10* (2013.01); *H04B 17/318* (2015.01); *H04B 17/345* (2015.01);
(Continued)

(58) Field of Classification Search
CPC ....... H04W 48/10; H04W 4/70; H04W 24/08; H04W 52/0258; H04W 72/0453;
(Continued)

(56) References Cited

U.S. PATENT DOCUMENTS

| 4,593,273 A | 6/1986 | Narcisse |
| 5,193,216 A | 3/1993 | Davis |

(Continued)

FOREIGN PATENT DOCUMENTS

| CN | 103227668 A | 7/2013 |
| EP | 1950889 A1 | 7/2008 |

(Continued)

OTHER PUBLICATIONS

Extended European search report for corresponding EP patent application 18155938.6, dated May 11, 2018.
(Continued)

*Primary Examiner* — Ian N Moore
*Assistant Examiner* — Latresa A McCallum
(74) *Attorney, Agent, or Firm* — Fredrikson & Byron, P.A.

(57) ABSTRACT

Some methods for detecting and avoiding radio interference in a wireless sensor network can include an access point device periodically transmitting a beacon message to a plurality of IoT enabled devices via a radio channel, upon receipt of the beacon message, an IoT enabled device attempting to decode the beacon message, the IoT enabled device measuring and storing a signal strength of a successfully decoded beacon message as signal strength data in a memory of the IoT enabled device, the IoT enabled device increasing a missed beacon counter stored in the memory of the IoT enabled device responsive to a beacon message that cannot be decoded, each of the plurality of IoT enabled devices periodically transmitting stored data to the access point device, and the access point device using the received data to identify an interference source, or an interference issue or a fading issue on the radio channel.

19 Claims, 1 Drawing Sheet

(51) Int. Cl.
*H04L 1/00* (2006.01)
*H04W 24/08* (2009.01)
*H04B 17/318* (2015.01)
*H04B 17/345* (2015.01)
*H04W 52/02* (2009.01)
*H04W 72/04* (2009.01)
*H04W 24/10* (2009.01)
*H04W 84/12* (2009.01)
*H04W 84/18* (2009.01)

(52) U.S. Cl.
CPC .............. *H04L 1/00* (2013.01); *H04W 4/70* (2018.02); *H04W 24/08* (2013.01); *H04W 52/0258* (2013.01); *H04W 72/0453* (2013.01); *H04W 24/10* (2013.01); *H04W 84/12* (2013.01); *H04W 84/18* (2013.01); *Y02D 30/70* (2020.08)

(58) Field of Classification Search
CPC ..... H04W 24/10; H04W 84/12; H04W 84/18; H04B 17/318; H04B 17/345; H04L 1/00; Y02D 70/142; Y02D 70/00; Y02D 70/162
See application file for complete search history.

(56) References Cited

U.S. PATENT DOCUMENTS

| | | | |
|---|---|---|---|
| 5,590,131 | A | 12/1996 | Kabatepe |
| 5,684,790 | A | 11/1997 | Hirasawa |
| 5,719,859 | A | 2/1998 | Kobayashi et al. |
| 6,356,771 | B1 | 3/2002 | Dent |
| 6,377,608 | B1 | 4/2002 | Zyren |
| 7,058,040 | B2 | 6/2006 | Schmidt |
| 7,079,831 | B2 | 7/2006 | Schwartzman et al. |
| 7,359,738 | B2 | 4/2008 | Daniels et al. |
| 7,430,400 | B2 | 9/2008 | Russo et al. |
| 7,817,612 | B2 | 10/2010 | Morioka |
| 7,974,230 | B1 * | 7/2011 | Talley ................. H04W 52/325 370/318 |
| 8,107,427 | B1 | 1/2012 | Husted et al. |
| 8,315,573 | B2 | 11/2012 | Bishop |
| 8,325,627 | B2 | 12/2012 | Pratt, Jr. et al. |
| 8,488,478 | B1 | 7/2013 | Leytus |
| 8,611,268 | B1 | 12/2013 | Thandaveswaran |
| 8,839,389 | B2 | 9/2014 | Cohen et al. |
| 9,072,107 | B2 | 6/2015 | Gauvreau et al. |
| 9,124,359 | B2 | 9/2015 | Ho |
| 9,420,592 | B2 | 8/2016 | Choi et al. |
| 9,603,152 | B2 | 3/2017 | Nam et al. |
| 2002/0142767 | A1 | 10/2002 | Mears et al. |
| 2002/0196803 | A1 | 12/2002 | Ota |
| 2005/0195088 | A1 | 9/2005 | Solak |
| 2006/0031437 | A1 | 2/2006 | Chambers |
| 2006/0265195 | A1 | 11/2006 | Woodard et al. |
| 2007/0197256 | A1 | 8/2007 | Lu et al. |
| 2007/0239888 | A1 | 10/2007 | Croxford |
| 2007/0247366 | A1 | 10/2007 | Smith et al. |
| 2007/0268884 | A1 | 11/2007 | Kolavennu et al. |
| 2007/0279242 | A1 | 12/2007 | Plocher et al. |
| 2007/0296575 | A1 | 12/2007 | Eisold et al. |
| 2008/0279155 | A1 | 11/2008 | Pratt, Jr. et al. |
| 2008/0316966 | A1 | 12/2008 | Joshi et al. |
| 2009/0042546 | A1 | 2/2009 | McClendon |
| 2009/0112626 | A1 | 4/2009 | Talbot et al. |
| 2009/0203971 | A1 | 8/2009 | Sciarappa et al. |
| 2009/0303931 | A1 | 12/2009 | Yamauchi |
| 2010/0102940 | A1 | 4/2010 | Baldwin et al. |
| 2010/0176952 | A1 | 7/2010 | Bajcsy et al. |
| 2010/0271220 | A1 | 10/2010 | Pattok et al. |
| 2011/0019652 | A1 | 1/2011 | Atwal |
| 2011/0176465 | A1 | 7/2011 | Panta et al. |
| 2012/0051339 | A1 * | 3/2012 | Chamberlain ............ H04L 1/20 370/337 |
| 2012/0093003 | A1 | 4/2012 | Lin |
| 2012/0106394 | A1 | 5/2012 | Apostolakis |
| 2012/0126700 | A1 | 5/2012 | Mayfield et al. |
| 2012/0172673 | A1 | 7/2012 | Friedman et al. |
| 2012/0201231 | A1 | 8/2012 | Omeni |
| 2012/0306284 | A1 | 12/2012 | Lee et al. |
| 2013/0029596 | A1 | 1/2013 | Preston et al. |
| 2013/0058318 | A1 | 3/2013 | Bhatia et al. |
| 2013/0077554 | A1 | 3/2013 | Gauvreau et al. |
| 2013/0149966 | A1 | 6/2013 | Lee et al. |
| 2013/0155957 | A1 | 6/2013 | Shin et al. |
| 2013/0336334 | A1 | 12/2013 | Gilbert et al. |
| 2014/0126655 | A1 | 5/2014 | Vijayasankar et al. |
| 2014/0218194 | A1 | 8/2014 | Gruber et al. |
| 2014/0233443 | A1 | 8/2014 | Kumar |
| 2014/0233536 | A1 | 8/2014 | Kang et al. |
| 2014/0321443 | A1 | 10/2014 | Samudrala et al. |
| 2014/0341109 | A1 | 11/2014 | Cartmell et al. |
| 2014/0376427 | A1 | 12/2014 | Hui et al. |
| 2015/0023314 | A1 | 1/2015 | Thubert et al. |
| 2015/0302728 | A1 | 10/2015 | Gettings et al. |
| 2016/0044661 | A1 | 2/2016 | Suresh |
| 2016/0165597 | A1 | 6/2016 | Konopacki, Jr. et al. |
| 2016/0269971 | A1 * | 9/2016 | Kim ........................ H04W 4/80 |

FOREIGN PATENT DOCUMENTS

| | | |
|---|---|---|
| EP | 2384078 A1 | 11/2011 |
| EP | 2988541 A1 | 2/2016 |
| KR | 1020090092495 A | 9/2009 |
| KR | 1020160077992 A | 7/2016 |
| WO | 2009116682 A1 | 9/2009 |
| WO | 2010146174 A2 | 12/2010 |
| WO | 2013033999 A1 | 3/2013 |
| WO | 2015187860 A1 | 12/2015 |

OTHER PUBLICATIONS

B. H. Jung et al., "Ubiquitous Wearable Computer (UWC)-Aided Coexistence Algorithm in an Overlaid Network Environment of WLAN and ZigBee Networks," 2007 2nd International Symposium on Wireless Pervasive Computing, San Juan, 2007, pp. 212-217.
English Abstract for Korean Publication No. KR10-2009-0092495A, published Sep. 1, 2009, 1 pg.
M. L. Huang and S. Park, "A WLAN and ZigBee coexistence mechanism for wearable health monitoring system," 2009 9th International Symposium on Communications and Information Technology, Icheon, 2009, pp. 555-559.
English Abstract and Machine Translation for International Publication No. WO 2010146174 A2, published Dec. 23, 2010, 28 pgs.
H. Khojasteh, M. Misic and V. B. Misic, "A two-tier integrated RFID/sensor network with a WiFi WLAN," 2012 8th International Wireless Communications and Mobile Computing Conference (IWCMC), Limassol, 2012, pp. 521-525, 5 pgs.
English Abstract and Machine Translation for Chinese Publication No. CN 103227668 A, published Jul. 31, 2013, 7 pgs.
English Abstract for International Publication No. WO 2013033999 A1, published Mar. 14, 2013, 28 pgs.
Extended European search report for corresponding EP patent application, 15175774.7, dated Nov. 27, 2015, 8 pgs.
English Abstract and Machine Translation for Korean Publication No. KR10-2016-0077992, published Jul. 4, 2016, 13 pgs.
Wikipedia, Near field communication, Downloaded from internet http://en.wikipedia.org/wiki/Near_field_communication Downloaded from internet http://en.wikipedia.org/wiki/Near_field_communication on Sep. 4, 2019, 15 pgs.

* cited by examiner

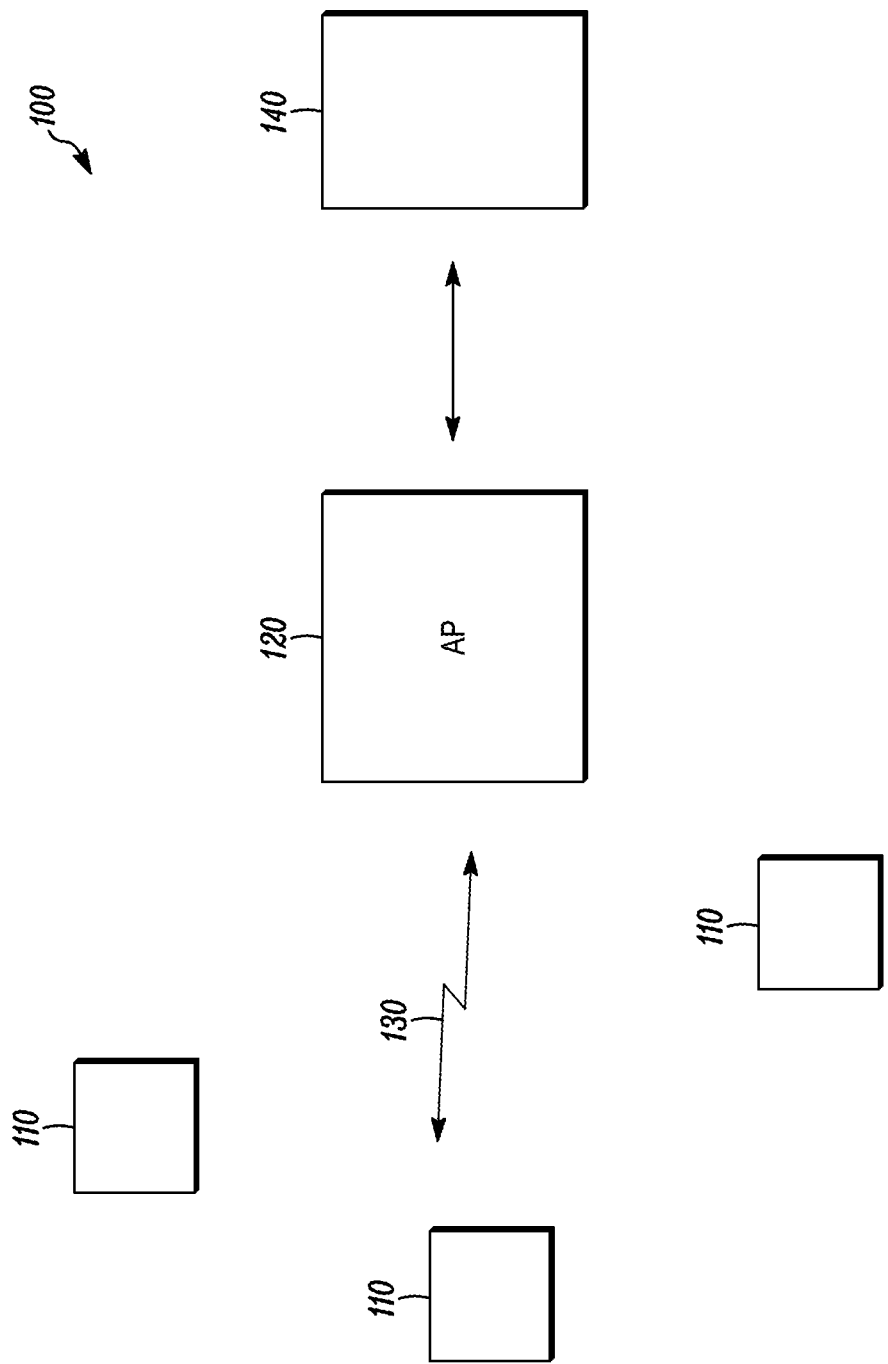

The present invention relates generally to wireless sensor

SYSTEMS AND METHODS FOR DETECTING AND AVOIDING RADIO INTERFERENCE IN A WIRELESS SENSOR NETWORK

CROSS-REFERENCE TO RELATED APPLICATIONS

This application is a continuation of and claims the benefit of the filing date of U.S. application Ser. No. 15/464,687 filed Mar. 21, 2017.

FIELD

The present invention relates generally to wireless sensor networks. More particularly, the present invention relates to systems and methods for detecting and avoiding radio interference in a wireless sensor network.

BACKGROUND

Many consumer electronic devices, such as household items, are Internet of Things (IoT) enabled devices such that these devices have the ability to connect to the Internet so that data can be collected and exchanged via the Internet. Furthermore, many IoT enabled devices are wirelessly connected to the Internet so that each device does not need a cable tethered to a router.

Known IoT enabled devices communicate using one or more communication protocols, including, for example, WiFi, 6LowPan, Zigbee PRO, Zigbee iControl, and Thread. Although there are different protocol standards for IoT device communication, all known IoT enabled devices use the 2.4 GHz radio band to communicate, thereby potentially causing harmful interference to each other. Furthermore, because communication between IoT enabled devices is primarily burst mode communication, inter-device interference resulting from such communication is difficult to detect with traditional RF jamming detection algorithms. For these and other reasons, the co-existence of devices communicating on the 2.4 GHz radio band is an issue that can cause poor RF performance for all such devices present in a region.

In view of the above, there is a continuing, ongoing need for improved systems and methods.

BRIEF DESCRIPTION OF THE DRAWINGS

FIG. 1 is a block diagram of a system in accordance with disclosed embodiments.

DETAILED DESCRIPTION

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein can include systems and methods for detecting and avoiding radio interference in a wireless sensor network. For example, some systems and methods disclosed herein can include detecting IoT enabled devices that communicate on the 2.4 GHz radio band and assuring reliable communication between such devices without user intervention. Indeed, systems and methods disclosed herein advantageously can detect interference on the 2.4 GHz radio band upon occurrence of the interference and, unlike known systems and methods, not wait to detect interference until an event message is not delivered. Accordingly, systems and methods disclosed herein can facilitate a user addressing interference problems by taking corrective action before a critical event, such as a fire or attack, occurs.

In accordance with disclosed embodiments, an access point device can transmit periodic beacon messages on a communication radio channel to an IoT enabled device to test the integrity of the radio channel to the IoT enabled device. For example, in some embodiments, the access point device can transmit the beacon message every quarter of a second or 240 beacons per minute, and each IoT enabled device in communication with the access point device can know when a beacon is sent so as to wake up or exit a low power sleep state to receive the beacon message or to count a missed beacon.

When an IoT enabled device receives a beacon message, the IoT enabled device can check the beacon message for accuracy and the signal strength of the beacon message and record the same in a memory of the IoT enabled device. When there is detrimental interference on the radio channel that carried the beacon message, the beacon message will be corrupted, and the IoT enabled device will be unable to decode the beacon message. This can be referred to as a missed beacon message. The IoT enabled device can count and store the number of missed beacons received from the access point device, can store the signal strength of received and decoded beacon messages, and can periodically transmit such missed beacon and signal strength data to the access point device and/or to a central control processor for analysis thereof. For example, in some embodiments, the interference can be intermittent, and the IoT enabled device can transmit the missed beacon and signal strength data during one or more time periods of minimal interference.

For example, the access point device and/or the central control processor can process data received from one or more IoT enabled devices and, when a particular IoT enabled device is experiencing a high rate of missed beacons, for example, more than a predetermined threshold amount, determine that the particular IoT enabled device is too close to an interference source and should be moved to another location. However, when many IoT enabled devices, for example, more than a predetermined threshold amount, are experiencing a high rate of missed beacons, the access point device and/or the central control processor can determine that there is interference on a first 2.4 GHz channel on which communication in the system of which the IoT enabled devices is occurring and that such communication should be moved from the first 2.4 GHz channel to a second, different 2.4 GHz channel.

In some embodiments, fluctuations in the signal strength of beacon messages received by an IoT enabled device as disclosed and described herein can indicate the amount of fading occurring in the radio channel that carried those beacon messages. Accordingly, when the signal strength of beacon messages received by many IoT enabled devices, for example, more than a predetermined amount, is lower than a minimum required signal strength threshold amount, the access point and/or the central monitoring processor can determine that there is fading occurring on a first 2.4 GHz channel on which communication in the system of which the IoT enabled devices are a part is occurring and that such communication should be moved from the first 2.4 GHz channel to a second, different, 2.4 GHz channel. However, when the signal strength of beacon messages received by only a particular IoT enabled device is lower than a minimum required signal strength, the access point and/or the central monitoring processor can determine that the particular IoT enabled device is too close to an interference source and should be moved to another location.

In some embodiments, the fluctuations in the signal strength of beacon messages received by an IoT enabled device as disclosed and described herein can also be indicative of movement within a region. Accordingly, the access point device and/or the central monitoring processor can aggregate the signal strength data for all IoT enabled devices in a system and use the aggregated data to determine the number of people in the region and the movement of those people within the region. Such determinations can be used, for example, when monitoring elderly people or when responding to a fire or burglary, for example, by directing first responders to where people are located or by tracking the path of an intruder.

FIG. 1 is a block diagram of a system 100 in accordance with disclosed embodiments. As seen in FIG. 1, the system 100 can include a plurality of wireless IoT enabled sensors or devices 110 in communication with an access point device 120 on a radio channel 130. In some embodiments, the access point device 120 can transmit an RF beacon message on the radio channel 130 every quarter of a second, and each of the plurality of wireless IoT enabled sensors or devices 110 can wake up or exit a low power sleep state when the access point device 120 transmits the beacon message to receive and decode the beacon message.

Upon receipt of a beacon message, if an IoT enabled sensor or device 110 can decode the beacon message, then the IoT enabled sensor or device 110 can measure and store a signal strength of the beacon message in a memory of the IoT enabled sensor or device 110. However, upon receipt of a beacon message, if an IoT enabled sensor or device 110 cannot decode the beacon message, then the IoT enabled sensor or device 110 can increase a missed beacon counter in the memory of the IoT enabled sensor or device 110. Each of the plurality of IoT enabled sensors or devices 110 can accumulate and store measured signal strengths and the missed beacon counter until such data is requested from the access point device 120.

For example, the access point device 120 can request and receive the measured signal strength data and/or the missed beacon data from each of the plurality of IoT enabled sensors or devices 110. Then, the access point device 120 can process the received data or transmit the received data to a central monitoring processor 140 for processing thereof as disclosed and described above and herein. After one of the plurality of IoT enabled sensors or devices 110 transmits the missed beacon data to the access point 120, that sensor or device 110 can reset its missed beacon counter to zero to reset the count of missed beacons received by that sensor or device 110.

It is to be understood that each of the plurality of IoT enabled sensors or devices 110, the access point 120, and the central monitoring processor 140 as disclosed and described herein can include a transceiver device and a memory device each of which can be in communication with respective control circuitry, one or more programmable processors, and executable control software as would be understood by one of ordinary skill in the art. The executable control software can be stored on a transitory or non-transitory computer readable medium, including, but not limited to local computer memory, RAM, optical storage media, magnetic storage media, flash memory, and the like.

In some embodiments, some or all of the control circuitry, programmable processor, and control software can execute and control at least some of the methods disclosed and described above and herein. For example, in some embodiments, some or all of the control circuitry, programmable processor, and control software can control the transmission and reception of beacon messages, can identify when a beacon message is a missed beacon, can count the number of missed beacons, can decode beacon messages, can measure the signal strength of decoded beacon messages, can store measured signal strength data and missed beacon data, can control the transmission and reception of measured signal strength data and missed beacon data, and can analyze measured signal strength data or missed beacon data to identify an interference source proximate a device, to identify interference on a radio channel, to identify fading on a radio channel, or to identify a number and movement of people in an ambient region.

Although a few embodiments have been described in detail above, other modifications are possible. For example, the logic flows described above do not require the particular order described or sequential order to achieve desirable results. Other steps may be provided, steps may be eliminated from the described flows, and other components may be added to or removed from the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the spirit and scope of the invention.

What is claimed is:

1. A method comprising:
periodically transmitting, by an access point device, a beacon message to a plurality of internet of things (IoT) enabled devices via a radio channel for decoding the beacon message, for measuring and storing a respective measured signal strength of the beacon message as respective signal strength data in a respective memory of each of the plurality of IoT enabled devices, and for increasing a respective missed beacon counter stored in the respective memory of each of the plurality of IoT enabled devices when the beacon message cannot be decoded; periodically or responsive to transmitting a request message to the plurality of IoT enabled devices, the access point device receiving the respective signal strength data and a current number of the respective missed beacon counter of each of the plurality of IoT enabled devices from each of the plurality of IoT enabled devices; and determining, by the access point device or a network coordinator, that a first of the plurality of IoT enabled devices is proximate an interference source when the current number of the respective missed beacon counter of the first of the plurality of IoT enabled devices is higher than a first predetermined threshold or when at least some of the respective signal strength data of the first of the plurality of IoT enabled devices is lower than a second predetermined threshold, identifying an interference issue on the radio channel when the current number of the respective missed beacon counter of a first predetermined number of the plurality of IoT enabled devices is higher than a third predetermined threshold, or identifying a fading issue on the radio channel when at least some of the respective signal strength data of a second predetermined number of the plurality of IoT enabled devices is lower than the second predetermined threshold.

2. The method of claim 1 wherein the second predetermined threshold is a minimum required signal strength.

3. The method of claim 1 further comprising:
the access point device or the network coordinator identifying a respective fluctuation amount of the respective signal strength data of each of the plurality of IoT enabled devices; and
the access point device or the network coordinator determining that the first of the plurality of IoT enabled devices is proximate the interference source when the respective fluctuation amount of the respective signal strength data of the first of the plurality of IoT enabled devices is higher than a fourth predetermined threshold.

4. The method of claim 1 further comprising:
the access point device or the network coordinator identifying a respective fluctuation amount of the respective signal strength data of each of the plurality of IoT enabled devices; and
the access point device or the network coordinator identifying the fading issue on the radio channel when the respective fluctuation amount of the respective missed signal strength data of a third predetermined number of the plurality of IoT enabled devices is higher than a fourth predetermined threshold.

5. The method of claim 1 further comprising:
the access point device or the network coordinator identifying a respective fluctuation amount of the respective signal strength data of each of the plurality of IoT enabled devices; and
the access point device or the network coordinator identifying a presence, a number, or movement of people or objects within an ambient region based on the respective fluctuation amount of the respective signal strength data of each of the plurality of IoT enabled devices.

6. The method of claim 1 further comprising:
the access point device or the network coordinator aggregating the respective signal strength data of each of the plurality of IoT enabled devices to identify a presence, a number, or movement of people or objects within an ambient region.

7. The method of claim 1 wherein the radio channel operates in a 2.4 GHz frequency band.

8. The method of claim 1 further comprising:
the access point device or the network coordinator initiating correction action to address the interference source, the interference issue, or the fading issue prior to detecting an occurrence of a critical event.

9. The method of claim 1 wherein the beacon message cannot be decoded when the beacon message is corrupted or when a detrimental interference is on the radio channel.

10. The method of claim 1 further comprising:
the access point device transmitting the respective signal strength data and the current number of the respective missed beacon counter of each of the plurality of IoT enabled devices to the network coordinator.

11. A method comprising:
periodically receiving, by a first of a plurality of interne of things (IoT) enabled devices, a beacon message from an access point device via a radio channel;
the first of the plurality of IoT enabled devices attempting to decode the beacon message;
when the beacon message is successfully decoded, the first of the plurality of IoT enabled devices measuring and storing a measured signal strength of the beacon message as first signal strength data in a memory of the first of the plurality of IoT enabled devices;
when the beacon message cannot be decoded, the first of the plurality of IoT enabled devices increasing a first missed beacon counter stored in the memory; and
periodically or responsive to receiving a request message from the access point device, the first of the plurality of IoT enabled devices transmitting the first signal strength data and a current number of the first missed beacon counter to the access point device for use in determining that the first of the plurality of IoT enabled devices is proximate an interference source when the current number of the first missed beacon counter is higher than a first predetermined threshold or when at least some of the first signal strength data is lower than a second predetermined threshold, identifying an interference issue on the radio channel when the current number of a respective missed beacon counter of a first predetermined number of the plurality of IoT enabled devices is higher than a third predetermined threshold, or identifying a fading issue on the radio channel when at least some of respective signal strength data of a second predetermined number of the plurality of IoT enabled devices is lower than the second predetermined threshold.

12. The method of claim 11 wherein the second predetermined threshold is a minimum required signal strength.

13. The method of claim 11 further comprising:
the first of the plurality of IoT enabled devices transmitting the first signal strength data to the access point device for use in identifying a first fluctuation amount of the first signal strength data and determining that the first of the plurality of IoT enabled devices is proximate the interference source when the first fluctuation amount is higher than a fourth predetermined threshold, identifying the fading issue on the radio channel when a respective fluctuation amount of the respective signal strength data of a third predetermined number of the plurality of IoT enabled devices is higher than a fifth predetermined threshold, or identifying a presence, a number, or movement of people or objects within an ambient region based on the respective fluctuation amount of the respective signal strength data of each of the plurality of IoT enabled devices.

14. The method of claim 11 further comprising:
the first of the plurality of IoT enabled devices transmitting the first signal strength data to the access point device for aggregation with the respective signal strength data of each of the plurality of IoT enabled devices to identify a presence, a number, or movement of people or objects within an ambient region.

15. The method of claim 11 wherein the radio channel operates in a 2.4 GHz frequency band.

16. The method of claim 11 further comprising:
the first of the plurality of IoT enabled devices receiving an instruction signal from the access point device or a network coordinator to address the interference source, the interference issue, or the fading issue prior to the first of the plurality of IoT enabled devices detecting a critical event.

17. The method of claim 11 further comprising:
the first of the plurality of IoT enabled devices failing to decode the beacon message when the beacon message is corrupted or when a detrimental interference is on the radio channel.

18. The method of claim 11 further comprising:
the first of the plurality of IoT enabled devices periodically exiting a low power sleep state to receive the beacon message.

19. The method of claim 11 further comprising:
the first of the plurality of IoT enabled devices resetting the first missed beacon counter after transmitting the current number of the first missed beacon counter to the access point device.

\* \* \* \* \*